US008849083B1

(12) United States Patent
Samson et al.

(10) Patent No.: US 8,849,083 B1
(45) Date of Patent: Sep. 30, 2014

(54) ALL GLASS LEAKAGE CHANNEL FIBERS AND DEVICES USING THEM

(75) Inventors: Bryce N. Samson, Granby, CT (US); Kanxian Wei, Shrewsbury, MA (US); Liang Dong, Clemson, SC (US)

(73) Assignee: Nufern, East Granby, CT (US)

( * ) Notice: Subject to any disclaimer, the term of this patent is extended or adjusted under 35 U.S.C. 154(b) by 210 days.

(21) Appl. No.: 13/458,945

(22) Filed: Apr. 27, 2012

Related U.S. Application Data

(60) Provisional application No. 61/480,221, filed on Apr. 28, 2011.

(51) Int. Cl.
G02B 6/032 (2006.01)
G02B 6/02 (2006.01)

(52) U.S. Cl.
CPC ........ *G02B 6/02357* (2013.01); *G02B 6/02333* (2013.01); *G02B 6/02361* (2013.01); *G02B 6/02347* (2013.01)
USPC .......................................... 385/125; 385/123

(58) Field of Classification Search
CPC ............... G02B 6/02295; G02B 6/023; G02B 6/02314; G02B 6/02342; G02B 6/02333; G02B 6/02347; G02B 6/02352; G02B 6/02357; G02B 6/02361; G02B 6/14
USPC ......................................... 385/123, 125–127
See application file for complete search history.

(56) References Cited

U.S. PATENT DOCUMENTS

| 6,985,660 | B2 * | 1/2006 | Koshiba et al. | 385/123 |
| 7,106,932 | B2 * | 9/2006 | Birks et al. | 385/123 |
| 7,450,813 | B2 | 11/2008 | Dong et al. | |
| 7,502,540 | B2 * | 3/2009 | Miyabe et al. | 385/127 |
| 7,529,453 | B2 * | 5/2009 | Miyabe et al. | 385/125 |
| 7,693,379 | B2 * | 4/2010 | Imamura | 385/125 |
| 7,787,729 | B2 | 8/2010 | Dong et al. | |
| 7,903,919 | B2 * | 3/2011 | Mukasa | 385/125 |
| 7,920,767 | B2 * | 4/2011 | Fini | 385/123 |
| 8,437,594 | B2 * | 5/2013 | Tsuchida et al. | 385/125 |
| 2004/0052484 | A1 * | 3/2004 | Broeng et al. | 385/125 |
| 2004/0114897 | A1 * | 6/2004 | Koshiba et al. | 385/123 |
| 2008/0124036 | A1 * | 5/2008 | Miyabe et al. | 385/125 |

(Continued)

OTHER PUBLICATIONS

Kunimasa Saitoh et al., Design of Effectively Single-Mode Leakage Channel Fibers With Large Mode Area and Low Bending Loss, Electronics Express, IEICE 2009, Apr. 10, 2009.

(Continued)

*Primary Examiner* — Rhonda Peace
(74) *Attorney, Agent, or Firm* — McDonnell Boehnen Hulbert & Berghoff LLP

(57) ABSTRACT

The present invention relates generally to optical waveguides, and more particularly to optical fibers suitable for use with high optical energies, and to devices using them. One aspect of the invention is an optical fiber having a cross-sectional profile comprising a base glass material; a first ring of first low refractive index glass features disposed in the base glass material; and a second ring of second low refractive index glass features disposed in the base glass material outside of and substantially concentric with the first ring, wherein the optical fiber has a loss of less than about 0.7 dB/m for the fundamental mode and a loss greater than about 10 dB/m for all other modes in a coiled configuration having a coil diameter in the range of about 20 cm to about 200 cm.

20 Claims, 11 Drawing Sheets

(56) References Cited

U.S. PATENT DOCUMENTS

| | | |
|---|---|---|
| 2008/0159704 A1* | 7/2008 | Miyabe et al. ............... 385/127 |
| 2009/0097810 A1* | 4/2009 | Imamura ...................... 385/125 |
| 2009/0162020 A1* | 6/2009 | Mukasa ........................ 385/125 |
| 2009/0180746 A1* | 7/2009 | Mukasa ........................ 385/125 |
| 2010/0157418 A1 | 6/2010 | Dong et al. |
| 2010/0296786 A1* | 11/2010 | Shimotakahara et al. .... 385/127 |
| 2013/0064543 A1* | 3/2013 | Imamura ........................ 398/43 |

OTHER PUBLICATIONS

Kunimasa Saitoh et al., Limitation on Effective Area Of Large-Mode-Area Leakage Channel Fibers Under Bent Condition, Graduate School of Informatio Science and Technology, Hokkaido University, Sapporo 060-0814, Japan (2010).

Liang Dong et al., Ytterbium-Doped All Glass Leakage Channel Fibers With Highly Fluorine-Doped Silica Pump Cladding, Optics Express, vol. 17, No. 11, May 25, 2009, pp. 8962-8969.

* cited by examiner

ALL GLASS LEAKAGE CHANNEL FIBERS AND DEVICES USING THEM

CROSS-REFERENCE TO RELATED APPLICATIONS

This application claims the priority of U.S. Provisional Patent Application Ser. No. 61/480,221, which is hereby incorporated herein by reference in its entirety.

STATEMENT REGARDING FEDERALLY SPONSORED RESEARCH

This invention was made with Government support under grant no. FA9451-10-D-0238 awarded by The High Energy Laser Joint Technology Office (HEL-JTO). The United States Government has certain rights in this invention.

BACKGROUND OF THE INVENTION

1. Field of the Invention

The present invention relates generally to optical waveguides for the transmission of electromagnetic energy. The present invention relates more particularly to optical fibers suitable for use with high optical energies, and to devices using them.

2. Technical Background

Fiber lasers have many attractive properties that make them suitable for various industrial applications. Such properties can include one or more of good beam quality, easy thermal management, compact size, and good efficiency. Fiber lasers are therefore often preferred to conventional types of lasers, such as solid-state and gas lasers. Fiber lasers are able to produce optical output in the several kW range with excellent beam quality. Thus, these lasers can be used for macro-machining applications like welding and cutting of metal. Furthermore, fiber lasers lend themselves to operation with ultrashort pulses by a method of mode-locking, enabling them to be used in micro-machining applications as well.

As any laser, a fiber laser can include a gain medium, an optical resonator, means of coupling energy into the gain medium, and means of extracting light out of the optical resonator. The gain medium in a fiber laser can include a length of an optical fiber, the "active fiber," which is coupled to a source of pump energy. Typically the core of the active fiber is doped with optically active atoms such as rare earth atoms (e.g., Er or Yb). The optical resonator can be formed by surrounding the gain medium with mirrors that, when properly aligned with respect to the active fiber, force some of the light emitted by the active atoms to bounce between the mirrors through the gain medium and get amplified. The mirrors can be either bulk optical mirrors, or they can be directly fabricated into optical fibers. In the latter case they are usually fiber Bragg gratings (FBGs), but other fiber-based or free space mirrors can also be used. Fiber-based mirrors are attractive since they can be directly attached or spliced to other fibers with very low optical losses. The mirrors, or typically only one of the two mirrors, are made only partially reflective to provide a route for extraction of light out of the optical resonator. In fiber lasers, the extracted light can be further guided with a length of optical fiber close to the point of interest, such as a work-piece. The extracted light thus forms a beam of laser light that can be used in the final application.

Fiber amplifiers are likewise attractive devices that are suitable for a variety of applications. In a fiber amplifier, an optical signal to be amplified is transmitted through the active fiber; pump energy stimulates the amplification of the optical signal in the active fiber.

In both types of active fiber devices, the power levels in the active fiber are often in the range of tens of watts, even up to over a kilowatt. Such high powers can result in deleterious nonlinear effects in the fiber itself, such as self-phase modulation, Raman scattering and Brillouin scattering. Accordingly, active fibers with large mode areas are often used. When the power is spread over a larger area, the average power density is lowered, thereby reducing the magnitude of these nonlinear effects. However, in order to retain single mode operation, the numerical aperture of the active fiber must be reduced, thereby increasing the bend sensitivity of the fiber. Such fibers can complicate use in actual devices, as they cannot be coiled in a space-efficient manner.

Accordingly, there remains a need for optical fibers that provide effectively single mode operation with low loss, even when in a coiled configuration.

SUMMARY OF THE INVENTION

In one aspect, the invention provides an optical fiber for use with radiation of a wavelength, the optical fiber having a cross-sectional profile comprising
  a base glass material;
  a first ring of first low refractive index glass features disposed in the base glass material; and
  a second ring of second low refractive index glass features disposed in the base glass material outside of and substantially concentric with the first ring of first low refractive index glass features,
wherein the refractive index profile of the base glass material, and the refractive indices, sizes and spacings of the first and second low refractive index glass features provide a loss of less than about 0.7 dB/m for the fundamental mode and a loss greater than about 10 dB/m for all other modes in a coiled configuration having a coil diameter in the range of about 20 cm to about 200 cm.

In another aspect, the invention provides an optical fiber for use with radiation of a wavelength, the optical fiber having a cross-sectional profile comprising:
  a base glass material;
  a first ring of first low refractive index glass features disposed in the base glass material; and
  a second ring of second low refractive index glass features disposed in the base glass material outside of and substantially concentric with the first ring of first low refractive index glass features,
wherein the refractive index profile of the base glass material, and the refractive indices, sizes and spacings of the first and second low refractive index glass features provide a loss of less than about 0.1 dB/m for the fundamental mode and a loss greater than about 10 dB/m for all other modes over a range of coiled configurations, the range of coiled configurations having a difference between smallest diameter and largest diameter in the range of about 1 cm to about 25 cm In another aspect, the invention provides an optical fiber device comprising a coil of optical fiber, the coil having a diameter in the range of about 20 cm to about 200 cm, the optical fiber having a cross-sectional profile comprising
  a base glass material;
  a first ring of first low refractive index glass features disposed in the base glass material; and a second ring of second low refractive index glass features disposed in the base glass material outside of and substantially concentric with the first ring of first low refractive index glass features, wherein the refractive index profile of the base glass material, and the refractive indices, sizes and spacings of the first and second low refractive index glass features provide an overall coil loss of less than about 4 dB for the fundamental mode and a loss greater than about 10 dB for all other modes In another aspect, the invention provides an optical fiber device comprising the optical fiber as described herein, disposed in a coiled configuration, the coil having a diameter such that the optical fiber has a loss of less than about 0.1 dB/m for the fundamental mode and a loss greater than about 10 dB/m for all other modes.

BRIEF DESCRIPTION OF THE DRAWINGS

The accompanying drawings are not necessarily to scale, and sizes of various elements can be distorted for clarity.

DETAILED DESCRIPTION OF THE INVENTION

Figure 1:
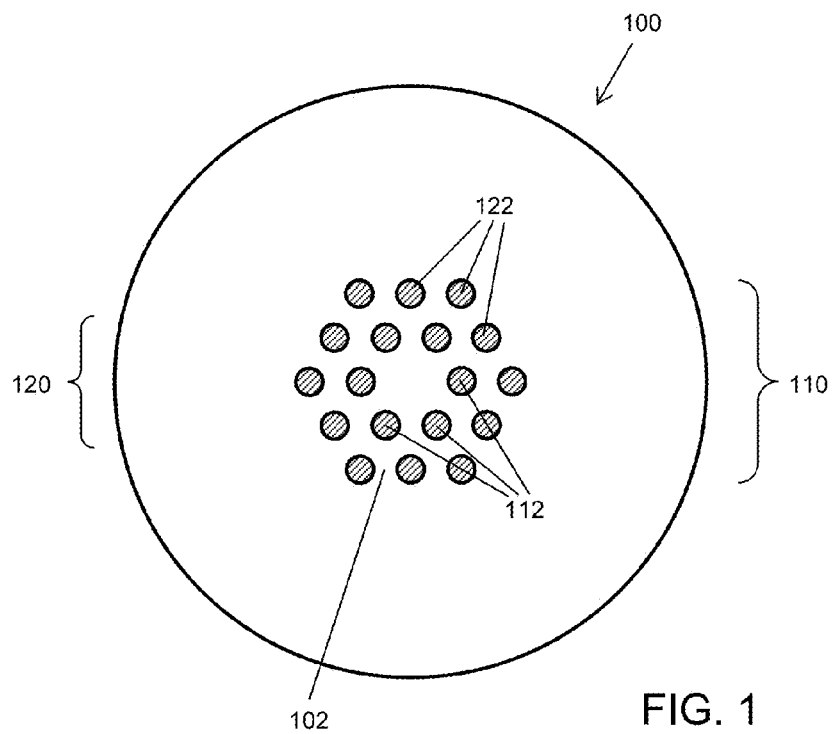
FIG. 1 is a cross-sectional schematic view of an optical fiber according to one embodiment of the invention.

One aspect of the present invention is an optical fiber, shown in cross-sectional view in FIG. 1. Optical fiber 100 has a cross-sectional profile having a base glass material 102, a first ring 110 of first low refractive index glass features 112 disposed in the base glass material 102, and a second ring 120 of second low refractive index glass features 122 disposed in the base glass material, outside of and substantially concentric with the first ring of first low refractive index glass features. The first and second low refractive index glass features effectively act as a cladding for the region that they surround, thus forming an optical fiber core region in which optical power can be guided. The spaces between the features break the continuity of the core/clad boundary to form a "leakage channel" for modes guided in the core. The refractive indices, sizes and spacings of the first and second low refractive index glass features 112 and 122 provide a loss of less than about 0.7 dB/m for the fundamental mode and a loss greater than about 10 dB/m for all other modes when the optical fiber is disposed in a coiled configuration. The coiled configuration can be, for example, in the range of about 20 cm to about 200 cm; about 20 cm to about 80 cm; about 30 cm to about 70 cm; or about 40 cm to about 60 cm.

For example, in certain embodiments of the optical fibers as described herein, the refractive index profile of the base glass material, and the refractive indices, sizes and spacings of the first and second low refractive index glass features provide a loss of less than about 0.5 dB/m for the fundamental mode. In other embodiments of the optical fibers as described herein, the refractive index profile of the base glass material, and the refractive indices, sizes and spacings of the first and second low refractive index glass features provide a loss of less than about 0.3 dB/m for the fundamental mode. In still other embodiments of the optical fibers as described herein, the refractive index profile of the base glass material, and the refractive indices, sizes and spacings of the first and second low refractive index glass features provide a loss of less than about 0.1 dB/m for the fundamental mode.

In certain embodiments of the optical fibers as described herein, the refractive index profile of the base glass material, and the refractive indices, sizes and spacings of the first and second low refractive index glass features provide a loss greater than about 15 dB/m for all other modes. In other embodiments of the optical fibers as described herein, the refractive index profile of the base glass material, and the refractive indices, sizes and spacings of the first and second low refractive index glass features provide a loss greater than about 20 dB/m for all other modes. In still other embodiments of the optical fibers as described herein, the refractive index profile of the base glass material, and the refractive indices, sizes and spacings of the first and second low refractive index glass features provide a loss greater than about 25 dB/m for all other modes.

While not formally single mode, the optical fibers of the present invention can behave in practice as single mode fibers, because the inventive designs have a low loss for the fundamental mode, and relatively high losses for all other modes. Accordingly, while higher order modes are formally allowed to propagate, they "leak" out of the fiber, leaving only the fundamental mode to propagate over any meaningful distance. The optical fibers of the present invention can be useful for high-power fiber lasers and amplifiers, as they can increase the threshold for deleterious nonlinear effects while maintaining good beam quality. Indeed, the optical fibers of the present invention can achieve essentially single mode operation at core region diameters even in the range of 40 μm to 150 μm with acceptable bend losses and mode quality for the fundamental mode in a coiled configuration, as compared with the limit of 20-30 μm for conventional large mode area fibers.

In certain embodiments, the optical fiber has a loss of less than about 0.7 dB/m (or about 0.5 dB/m, about 0.3 dB/m or even about 0.1 dB/m) for the fundamental mode and a loss greater than about 10 dB/m (or about 15 dB/m, about 20 dB/m, or even about 25 dB/m) for all other modes over a range of coiled configurations, the range of coiled configurations having a difference between smallest diameter and largest diameter in the range of about 1 cm to about 25 cm. In certain embodiments, the range of coiled configurations has a difference between smallest diameter and largest diameter in the range of about 1 cm to about 15 cm, or even in the range of about 1 cm to about 10 cm. The present inventors have determined that in certain leakage channel fibers (e.g., certain fibers in which the first low refractive index glass features differ substantially from the second low refractive index glass features in size, refractive index, or both), modal losses for the fundamental mode have a local minimum at a certain coil diameter, and actually start to increase as the coil diameter increases. This result is surprising because in conventional optical fibers, modal losses decrease as the coil diameter increases. This result, along with the lower losses at larger coil diameters of the higher order modes, tends to constrain the window of acceptable coil diameters to a relatively narrow value.

The optical fibers described herein can be designed for use at a variety of wavelengths. For example, in certain embodiments, the optical fiber is designed for use at one or more wavelengths in the range of 800 nm to 2400 nm. For example, in certain embodiments, the optical fiber is designed for use at one or more wavelengths in the range 1000 nm-1100 nm; 1270 nm-1330 nm; 1450 nm-1500 nm; or 1520 nm-1610 nm.

Another aspect of the invention is an optical fiber device for use with radiation of a wavelength. The optical fiber device includes a coil of the optical fiber described herein (e.g., as described above, or as further described below). The coil is of a diameter such that the refractive index profile of the base glass material, and the refractive indices, sizes and spacings of the first and second low refractive index glass features provide a loss of less than about 0.1 dB/m for the fundamental mode and a loss greater than about 10 dB/m for all other modes.

Figure 2A:
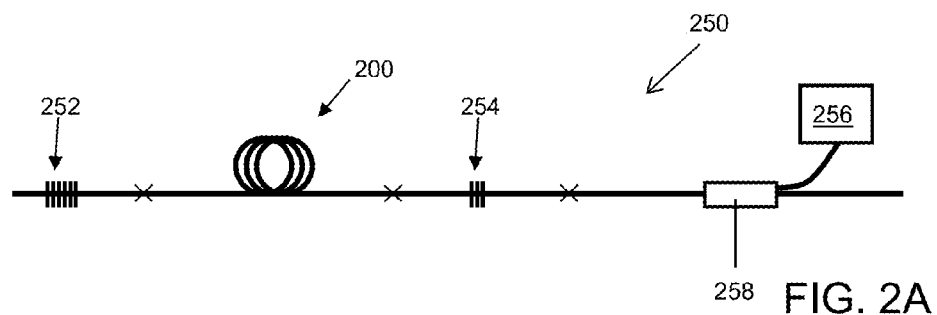
FIGS. 2A and 2B are schematic views of optical fiber devices according to certain embodiments of the invention.

One example of an optical fiber device according to the present invention is shown in schematic view in FIG. 2A. Optical fiber device 250 is configured as a fiber laser. Optical fiber 200 is rare earth-doped, for example, as described below, and is provided as a coil, for example, having a diameter of about 50 cm. To either end of the coil is spliced a fiber Bragg grating; grating 252 is completely reflective at the laser wavelength, while grating 254 is only partially reflective, thus serving as an output for laser power. A pump laser 256 is coupled in a counter-pumping configuration through coupler 258. Of course, the person of skill in the art will recognize that the optical fiber devices of the present inventions can take many other forms. In certain embodiments, the device is configured for the generation or transmission of optical power greater than about 10 W, or even greater than about 1 kW.

Figure 2B:
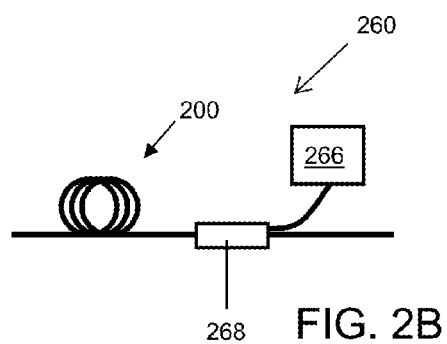

Another example of an optical fiber device according to the present invention is shown in schematic view in FIG. 2B. Optical fiber device 260 is configured as a fiber amplifier. Optical fiber 200 is rare earth-doped, for example, as described below, and is provided as a coil, for example, having a diameter of about 50 cm. A pump laser 266 is coupled in a counter-pumping configuration through coupler 268. Of course, the person of skill in the art will recognize that the optical fiber amplifier devices of the present invention can take many other forms.

Another aspect of the invention is an optical fiber device that includes a coil of optical fiber, for example as described above. The coil has a diameter in the range of about 20 cm to about 200 cm. The optical fiber has a cross-sectional profile as described above. The refractive index profile of the base glass material, and the refractive indices, sizes and spacings of the first and second low refractive index glass features provide an overall coil loss of less than about 4 dB for the fundamental mode and a loss greater than about 10 dB for all other modes (i.e., over the length of the coiled optical fiber). In certain embodiments, the overall coil loss is less than about 2 dB for the fundamental mode. In other embodiments, the overall coil loss is less than about 1 dB for the fundamental mode. In certain embodiments, the overall coil loss is greater than about 15 dB for all other modes. In other embodiments, the overall coil loss is greater than about 20 dB (or even about 25 dB) for all other modes. The optical fibers as described herein can be used in the devices according to this aspect of the invention.

In certain embodiments of the optical fibers and optical fiber devices of the present invention, the effective area of the fundamental mode of the optical fiber is at least about 300 $\mu m^2$. For example, in one embodiment, the effective area of the fundamental mode of the optical fiber is at least about 600 $\mu m^2$. In other embodiments, the effective area of the fundamental mode of the optical fiber is at least about 1000 $\mu m^2$. The person of skill in the art will calculate the effective area of the fundamental mode using conventional calculations.

In certain embodiments of the optical fibers and optical fiber devices of the present invention, the first low refractive index glass features differ substantially from the second low refractive index glass features in size, refractive index, or both. The present inventors have determined that when the first low refractive index glass features are different from the second low refractive index glass features, the optical fiber can exhibit a number of surprising and beneficial properties as described herein.

In certain embodiments of the optical fibers and optical fiber devices of the present invention, the coil diameter is in the range of about 20 cm to about 100 cm, or even in the range of about 40 cm to about 70 cm. In other embodiments, the coil diameter is in the range of about 20 cm to about 70 cm. The optical fibers of the present invention can be designed to have effectively single mode behavior in a coiled configuration of such diameters.

As the person of skill in the art will appreciate, the optical fibers of the present invention can be constructed from a number of materials. "Stack and draw" techniques used in making conventional microstructured optical fibers can be used to manufacture the optical fibers according to the present invention.

In certain embodiments, the base glass material is substantially undoped silica. In other embodiments, the base glass is silica doped with one or more materials. Suitable dopants can include, for example, phosphorus, germanium, fluorine, boron and aluminum, depending on the application. Doping can be used, for example, to provide desired mechanical or thermal properties to the base glass material, or to provide a desired refractive index to the base glass material. The person of skill in the art will understand that different glasses can be used as the "base glass material" in different sections (e.g., different annular sections) of the optical fiber.

In certain embodiments, the base glass material includes at least one region of rare earth-doped silica. The rare earth can be, for example, ytterbium, erbium, thulium, praseodymium or neodymium. As is conventional in the art, such fibers can provide optical gain, and therefore are useful as active fibers in optical lasers and amplifiers. Base glass material including a rare earth can optionally be doped with one or more other materials, for example, to provide desired mechanical or thermal properties to the base glass material, to provide a desired refractive index to the base glass material, or to provide a desirable environment for the rare earth (e.g., to reduce clustering). In one embodiment, the rare earth-doped silica is silica doped with rare earth oxide (e.g., ytterbium (III) oxide) as well as oxides of aluminum, boron and phosphorus. Rare earth-doped glass compositions are well known in the art, and such compositions can be used or modified by the skilled artisan for use in the optical fibers and optical fiber devices of the present invention.

In certain embodiments, the base glass material includes rare earth-doped silica in the center of the fiber, and silica not doped with rare earth but optionally doped with one or more other materials surrounding the rare earth-doped silica. In such embodiments, generation of optical power is constrained to the core region of the fiber, where it can be efficiently guided in the fundamental mode. For example, in certain embodiments, the rare earth-doped silica extends to at least about 50%, or even at least about 65% of the area inside the first ring of first low refractive index glass features. For example, in one embodiment, the rare earth-doped silica extends to in the range of about 70% to about 95% of the area inside the first ring of low refractive index glass features.

Figure 3:
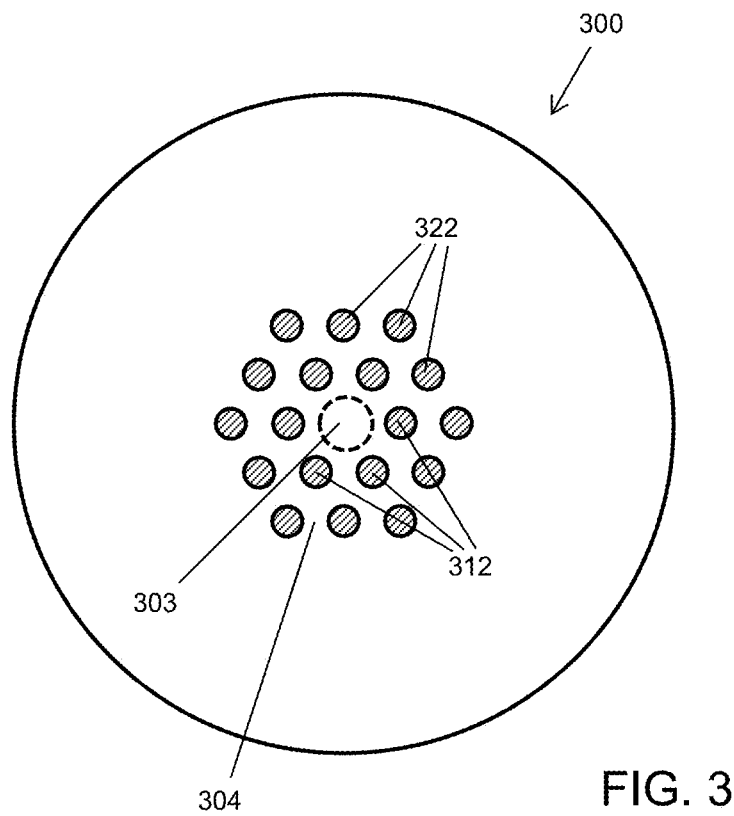
FIG. 3 is a cross-sectional schematic view of an optical fiber according to one embodiment of the invention.

An example of such an embodiment is shown in cross-sectional schematic view in FIG. 3. Optical fiber 300 includes a base glass material which includes rare earth-doped silica 303 in the center of the fiber and undoped silica 304 surrounding the fiber. The rare earth-doped silica extends most of the way throughout the core region. First low refractive index glass features 312 are disposed in a first ring in the undoped silica surrounding the core region; and second low refractive index features 322 are disposed in a second ring surrounding the first ring of first low refractive index features.

In certain embodiments, the difference between the refractive index of the rare earth-doped silica and the refractive index of the silica not doped with rare earth is no greater than about 0.001. For example, the difference can be no greater than about 0.0007, or even no greater than about 0.0004. A minimal difference in refractive index is desired to minimize any waveguiding or other optical perturbations as a result of the difference between the materials. The rare earth-doped silica, the silica not doped with rare earth, or both can be doped with other materials in order to provide the desired refractive indices.

In certain embodiments, the first low refractive index glass features are formed from fluorine-doped silica. For example, in certain embodiments, the first low refractive index glass features have a refractive index in the range of about 0.0005 to about 0.0400 less than the refractive index of the base glass material in which they are disposed. In one such embodiment, the first low refractive index glass features have a refractive index in the range of about 0.0005 to about 0.0040 less than the refractive index of the base glass material in which they are disposed. In another such embodiment, the first low refractive index glass features have a refractive index in the range of about 0.0070 to about 0.0300 less than the refractive index of the base glass material in which they are disposed.

The first low refractive index glass features can have a variety of shapes and sizes. For example, in certain embodiments, the first low refractive index glass features have diameters in the range of about 10 µm to about 70 µm. The first low refractive index glass features can, for example, be substantially round, or can take the shape of rounded polygons. When circular rods are used to make the first low refractive index glass features in stack-and-draw processing, the person of skill in the art will recognize that they will change shape somewhat to follow the geometry of the overall fiber structure. For example, when the low refractive index glass features are disposed substantially at points on a hexagonal lattice, the low refractive index glass features will often have the shape of rounded hexagons in the final optical fiber. Of course, the person of skill in the art will recognize that the first low refractive index glass features can take other shapes.

In certain embodiments, the second low refractive index glass features are formed from fluorine-doped silica. For example, in certain embodiments, the first low refractive index glass features have a refractive index in the range of about 0.0005 to about 0.0400 less than the refractive index of the base glass material in which they are disposed. In one such embodiment, the first low refractive index glass features have a refractive index in the range of about 0.0070 to about 0.0300 less than the refractive index of the base glass material in which they are disposed.

The second low refractive index glass features can have a variety of shapes and sizes. For example, in certain embodiments, the second low refractive index glass features have diameters in the range of about 10 µm to about 70 µm. The second low refractive index glass features can, for example, be substantially round, or can take the shape of rounded polygons. When circular rods are used to make the second low refractive index glass features in stack-and-draw processing, the person of skill in the art will recognize that they will change shape somewhat to follow the geometry of the overall fiber structure. For example, when the second low refractive index glass features are disposed substantially at points on a hexagonal lattice, the low refractive index glass features will often have the shape of rounded hexagons in the final optical fiber. Of course, the person of skill in the art will recognize that the second low refractive index glass features can take other shapes.

In certain embodiments, the first low refractive index glass features differ substantially in size from the second low refractive index glass features. For example, in certain embodiments, the first low refractive index glass features are substantially larger than the second low refractive index glass features.

The diameter of the first ring of first low refractive index glass features will strongly impact the size of the fundamental mode. For example, in certain embodiments, the first ring of first low refractive index glass features has an inner diameter in the range of about 20 µm to about 180 µm. In one embodiment, the first ring of first low refractive index glass features has an inner diameter in the range of about 35 µm to about 100 µm. The first ring of first low refractive index glass features can, for example, be provided as a substantially normal polygon having at least five sides, with a first low refractive index glass feature disposed substantially at each vertex of the polygon. In one embodiment, the first ring is provided as a normal hexagon. In certain embodiments, the center-to-center spacing of the first low refractive index glass features is in the range of about 10 µm to about 90 µm. In certain embodiments, the ratio of the diameter of the first low refractive index glass features to the center-to-center spacing of the first low-refractive index features is in the range of about 0.65 to about 0.90.

As described in more detail herein, the properties of the second ring of second low refractive index glass features will have a surprisingly important effect on the properties of the optical fiber. The second ring of second low refractive index glass features can, for example, provided as a normal polygon having at least 5 sides, with a second low refractive index feature at each vertex of the polygon, and at least one spaced evenly on each side of the polygon (e.g., as shown in FIG. 1 for the case of a hexagon). In certain embodiments, the center-to-center spacing of the second low refractive index glass features is in the range of about 10 µm to about 90 µm. In certain embodiments, the ratio of the diameter of the second low refractive index glass features to the center-to-center spacing of the second low-refractive index features is in the range of about 0.6 to about 0.85.

In certain embodiments, the optical fiber can be made to be polarization-maintaining by using two opposing low refractive index glass features that have different mechanical properties than the other low refractive index glass features in the ring. For example, the opposing low refractive index glass features can cause stress-induced birefringence. In one embodiment, two opposed low refractive glass features of a given ring (e.g., in the first ring of first low refractive index glass features) are highly boron-doped, such that they induce stress-induced birefringence in the resulting optical fiber, as is common in the optical fiber arts. Of course, other methods can also be used by the person of skill in the art to make the optical fiber polarization-maintaining.

Surprisingly, the present inventors have determined that the performance of a given optical fiber design when coiled depends strongly on the diameter of the coil. Accordingly, the person of skill in the art can determine acceptable ranges of parameters for the various fiber features for a given coil diameter, or vice versa.

The present inventors have determined that using different refractive indices and/or sizes for the first low refractive index glass features and the second low refractive index glass features can result in unexpectedly improved performance in a coiled configuration. For example, in certain embodiments, the refractive index difference between the first low refractive index glass features and the material in which they are disposed is substantially different from the refractive index difference between the second low refractive index glass features and the material in which they are disposed. In one such embodiment, the refractive index difference between the first low refractive index glass features and the material in which they are disposed is substantially smaller than the refractive index difference between the second low refractive index glass features and the material in which they are disposed. When using such designs, the differential mode loss (i.e., between the fundamental mode and higher order modes) can be increased, but the bend sensitivity of the fiber can also be increased. Accordingly, it can be desirable to carefully take the desired coil diameter into account when designing such fibers. In fact, in certain embodiments of the invention, the difference between the loss of the fundamental mode and the loss of the lowest-loss higher mode is greater in the coiled configuration than in a straight configuration.

The present inventors have also determined that using low refractive index glass features that differ substantially from the base glass material can result in unexpectedly improved performance in a coiled configuration. For example, in certain embodiments, the refractive index difference between the first low refractive index glass features and the material in which they are disposed and/or the refractive index difference between the second low refractive index glass features and the material in which they are disposed is at least 0.002 (i.e., less than the refractive index of the base glass material in which they are disposed). For example, in certain embodiments, the refractive index difference between the first low refractive index glass features and the material in which they are disposed and/or the refractive index difference between the second low refractive index glass features and the material in which they are disposed can be at least 0.005, or even at least 0.008. For example, in one embodiment, the refractive indices of the first low refractive index glass features and the second low refractive index glass features are at least 0.002 less than the refractive index of the base glass material(s) in which they are disposed.

In certain embodiments, the base glass material can be surrounded by a material having a lower index than the base glass material. This lower index material can serve as a cladding to guide pump radiation, as is conventional in the active optical fiber arts. The lower index material can be, for example, a glass material doped to have lower index than the base glass material (e.g., fluorine-doped silica). In an alternative embodiment, the lower index material can be a low index polymer material.

The present inventors have determined that an unexpected resonant coupling between the core region and the base glass material disposed between the low refractive index glass features plays a critical role in the waveguide losses for both the fundamental mode and the higher order modes. Accordingly the optical fiber can be designed for this unexpected effect, which can significantly reduce the overall tolerance for changes to the fiber design. Higher losses can be obtained for higher order modes in designs that use the resonance effect for further increasing out-coupling of the higher order modes.

The person of skill in the art can use conventional techniques in modeling fiber performance. For example, in the work described herein, the waveguide losses of modes in coiled fiber are calculated at 1050 nm using a commercial finite element mode solver from COMSOL (Burlington, Mass.). The fiber coil is simulated through a linear refractive index slope in the transverse plane of the fiber. Sufficient fine mesh is selected for the required numerical precision in the simulation. The mode solver obtains effective refractive index of modes in real numbers. Losses of the modes can be obtained from the imaginary part of the effective refractive index of each mode. Of course, the person of skill in the art will recognize that optical fiber modeling calculations can be performed in a number of ways.

Figure 4:
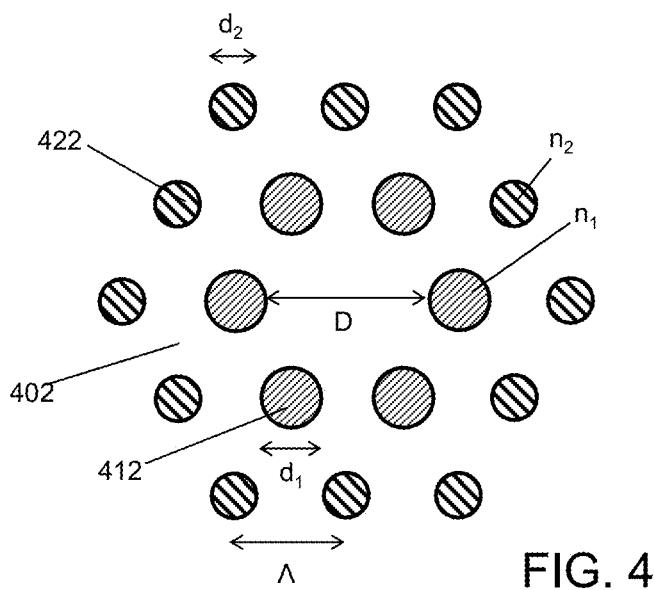
FIG. 4 is a cross-sectional schematic view of an optical fiber according to one embodiment of the invention, demonstrating the identities of certain parameters.

The parameters for an example of an optical fiber are shown in partial cross-sectional view in FIG. 4. In this optical fiber, the base material 402 has a refractive index $n_b$ of 1.444. It includes a first ring of first low refractive index glass features 412 each having a diameter $d_1$ disposed in a regular hexagon in the base glass material, such that the diameter (D) of the core region is 50 µm. The refractive index difference between the base glass material and the first low refractive index glass features $\Delta n_1$ is 0.0013. Disposed around the first ring is a second ring of second low refractive index glass features 422, each having a diameter $d_2$. The second ring is disposed along the same hexagonal lattice as is the first ring, one unit outward; accordingly, the second low refractive index glass features are at the vertices of a hexagon and at the center points of the edges of the hexagon. The center-to-center spacing of all low refractive index glass features is $\Lambda$. The refractive index difference between the base glass material and the second low refractive index glass features, $\Delta n_2$, is 0.0155.

Figure 5:
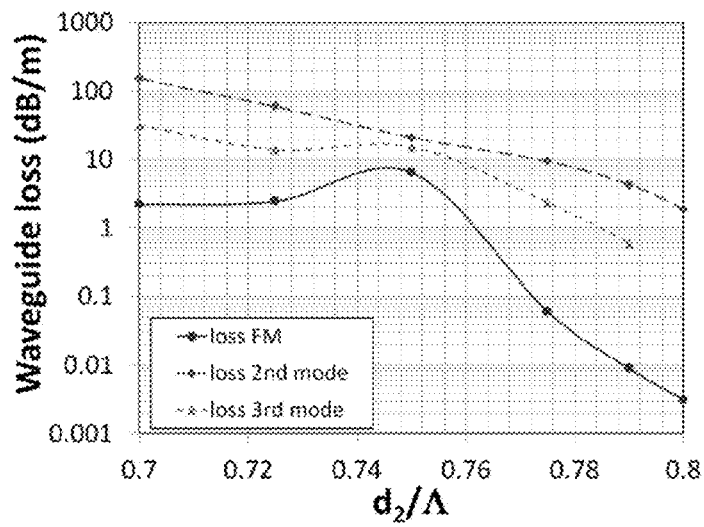
FIG. 5 is a graph of loss calculation results of a simulation for the fiber of FIG. 4.

FIG. 5 is a graph of the results of a simulation for the fiber of FIG. 4 in a coiled configuration, coil diameter 50 cm. The ratio of $d_1/\Lambda$ is 0.7. Results are shown for $d_2/\Lambda$ ranging from 0.7 to 0.8. Notably, a resonant coupling effect is observed at $d_2/\Lambda \sim 0.75$, increasing the loss of the fundamental mode to an unacceptable level. The position of this resonance does not strongly depend on values of $d_1/\Lambda$ between 0.7 and 0.8. For this optical fiber, the best performance is at $d_2/\Lambda \sim 0.775$, where the fundamental mode has a loss of about 0.06 dB/m and the second order mode has a loss of 2.4 dB/m at 50 cm coil diameter. However, this fiber does not meet the desired >10 dB/m loss for the second order mode. While the region $d_2/\Lambda<0.75$ is attractive in this fiber for its suitably high losses for higher order modes, it has undesirably high loss for the fundamental mode, even at values of $d_2/\Lambda$ where there is little resonance effect.

Figure 6:
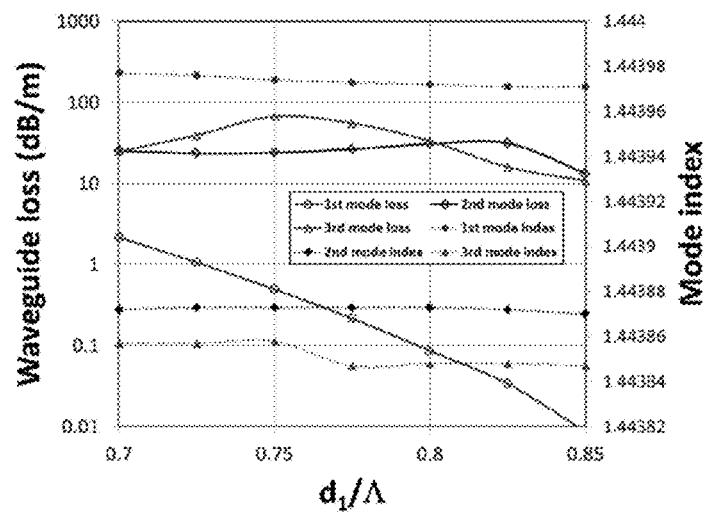
FIG. 6 is a graph of loss calculation results of simulations based on the general fiber design of FIG. 4, with $d_2/\Lambda$ fixed at 0.73 and $d_1/\Lambda$ varying from 0.7 to 0.85.

The inventors have determined that one way to reduce the fundamental mode loss in the region $d_2/\Lambda<0.75$ is to increase the value of $d_1/\Lambda$, in effect better confining the fundamental mode to the core region. FIG. 6 is a graph of results of simulations based on the general fiber design of FIG. 4, with $d_2/\Lambda$ fixed at 0.73 and $d_1/\Lambda$ varying from 0.7 to 0.85. Notably, when $d_1/\Lambda>0.79$, the loss of the fundamental mode is less than 0.1 dB/m. The losses of the higher order modes are greater than 10 dB/m for all values of $d_2/\Lambda$ up to 0.85; beyond that, higher order mode losses begin to fall beneath the 10 dB/m threshold.

Figure 7:
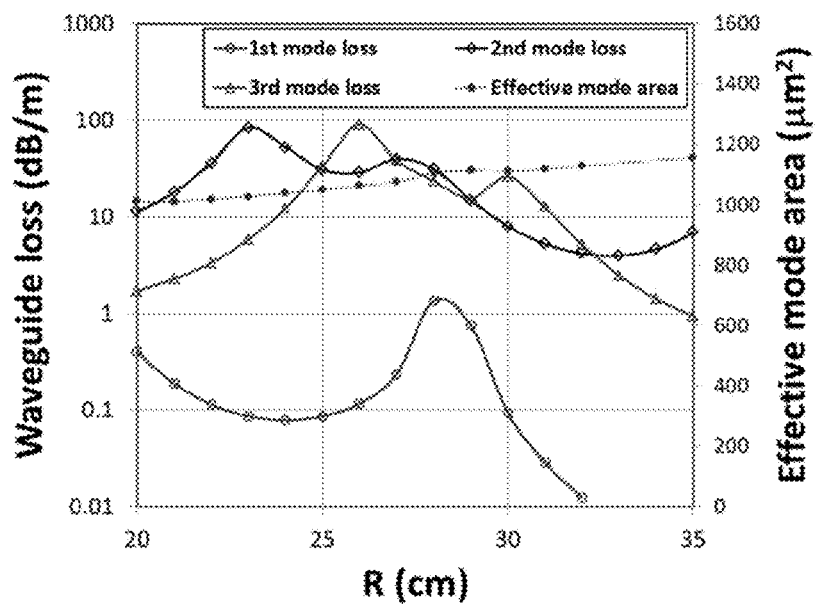
FIG. 7 is a graph showing the dependence of loss on radius for the fiber of FIG. 6.

The resonant coupling effect depends strongly on the coil radius, as shown in FIG. 7. For a fiber as generally shown in FIG. 4, with $d_1/\Lambda=0.8$ and $d_2/\Lambda=0.73$, the resonance occurs at coil radii between about 25 cm and about 30 cm. Accordingly, the magnitude and the position of the resonant coupling effect with respect to coil diameter should be taken into account, such that the fiber operates outside the resonant regime when deployed.

Figure 8:
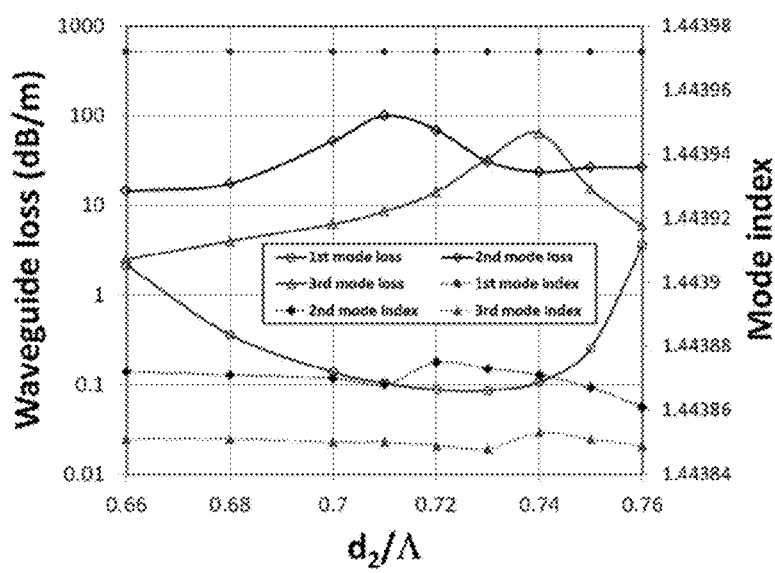
FIG. 8 is a graph of loss calculation results for a variety of $d_2/\Lambda$ values for a fiber with $d_1/\Lambda=0.8$, $\Delta n_1=0.0013$, $\Delta n_2=0.0155$, and coil diameter=50 cm.
Figure 9:
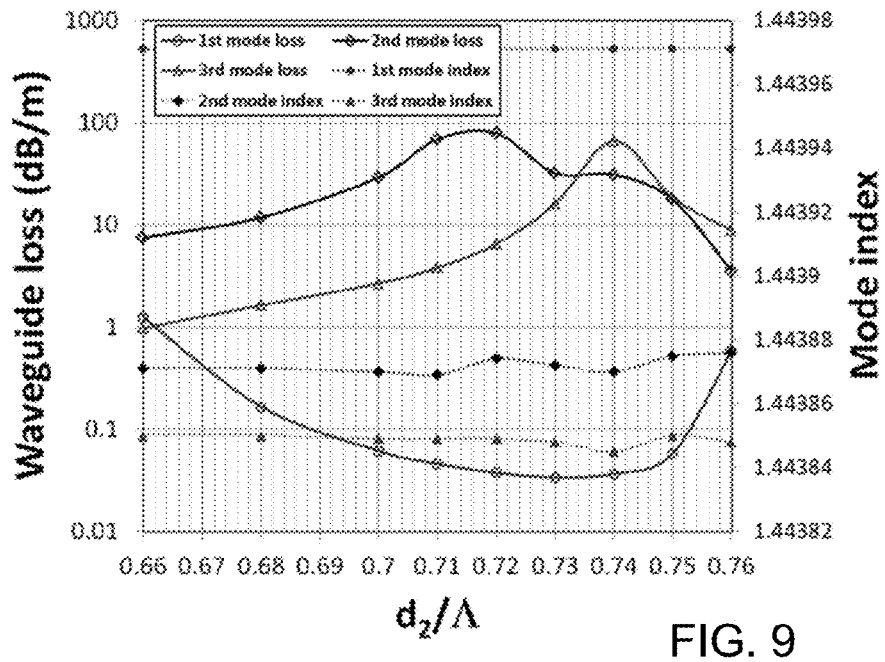
FIG. 9 is a graph of loss calculation results for a variety of $d_2/\Lambda$ values for a fiber with $d_1/\Lambda=0.825$, $\Delta n_1=0.0013$, $\Delta n_2=0.0155$, and coil diameter=50 cm.

The person of skill in the art can design optical fibers having $d_1/\Lambda$ in the range of about 0.7 to about 0.85 and in a limited range within about 0.65 to about 0.85, such that the desired coil diameter is outside the resonance regime. For example, FIG. 8 shows results for a variety of $d_2/\Lambda$ values for a fiber with $d_1/\Lambda=0.8$, $\Delta n_1=0.0013$, $\Delta n_2=0.0155$, and coil diameter=50 cm; the optical fiber has a loss of less than about 0.1 dB/m for the fundamental mode and a loss greater than about 10 dB/m for all other modes over a $d_2/\Lambda$ range of about 0.716 to about 0.739. FIG. 9 shows results for a variety of $d_2/\Lambda$ values for a fiber with $d_1/\Lambda=0.825$, $\Delta n_1=0.0013$, $\Delta n_2=0.0155$, and coil diameter=50 cm; the optical fiber has a loss of less than about 0.1 dB/m for the fundamental mode and a loss greater than about 10 dB/m for all other modes over a $d_2/\Lambda$ range of about 0.726 to about 0.751.

Figure 10:
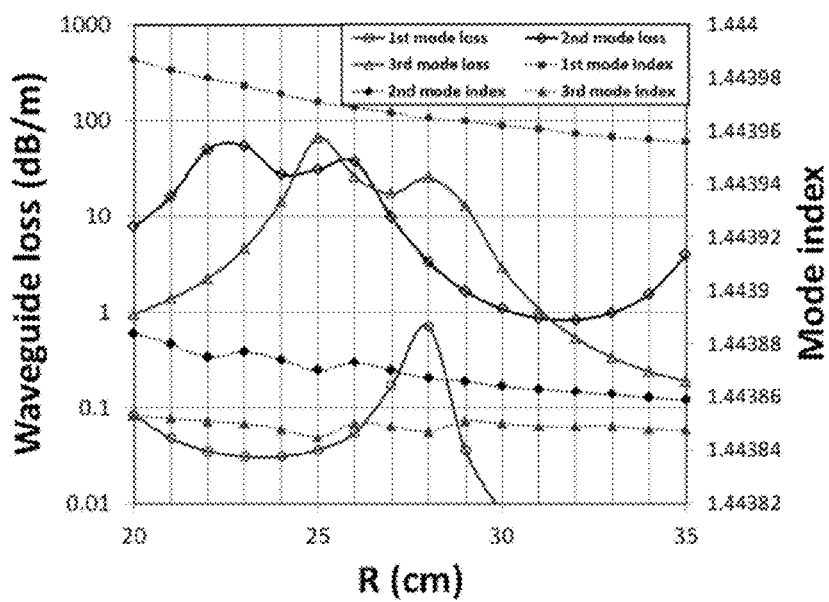
FIG. 10 is a graph showing the dependence of loss on radius for the fiber of FIG. 9.

As noted above, in certain embodiments, the optical fiber has a loss of less than about 0.1 dB/m for the fundamental mode and a loss greater than about 10 dB/m for all other modes over a range of coiled configurations, the range of coiled configurations having a difference between smallest diameter and largest diameter in the range of about 1 to about 15 cm. For example, in one such embodiment, the optical fiber has a loss of less than about 0.1 dB/m for the fundamental mode and a loss greater than about 10 dB/m for all other modes over a range of coiled configurations, the range of coiled configurations having a difference between smallest diameter and largest diameter in the range of about 3 to about 10 cm. In the diagram of FIG. 7, the difference between the smallest and largest coil diameter for which the optical fiber has a loss of less than about 0.1 dB/m for the fundamental mode and a loss greater than about 10 dB/m for all other modes is about 4.6 cm (i.e., 47.6 cm to 51.2 cm). FIG. 10 shows the dependence of loss on coil radius for a fiber with $d_1/\Lambda=0.825$, $\Delta n_1=0.0013$, $d_2/\Lambda=0.74$, $\Delta n_2=0.0155$; the difference between the smallest and largest coil diameter for which the optical fiber has a loss of less than about 0.1 dB/m for the fundamental mode and a loss greater than about 10 dB/m for all other modes is about 7.6 cm (i.e., 47.4 cm to 54 cm).

Figure 11:
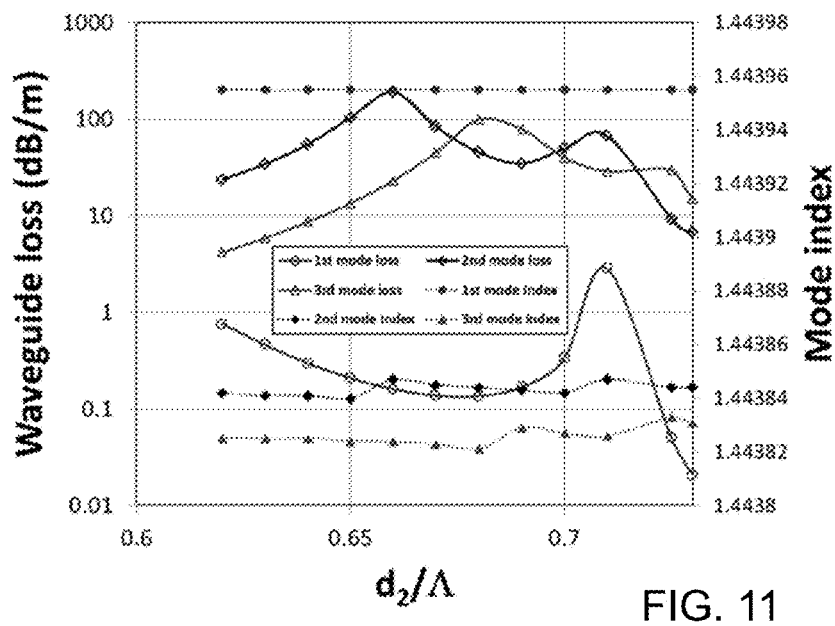
FIG. 11 is a graph showing loss calculation results for a fiber with $d_1/\Lambda=0.7$, and $\Delta n_1=\Delta n_2=0.0155$.
Figure 12:
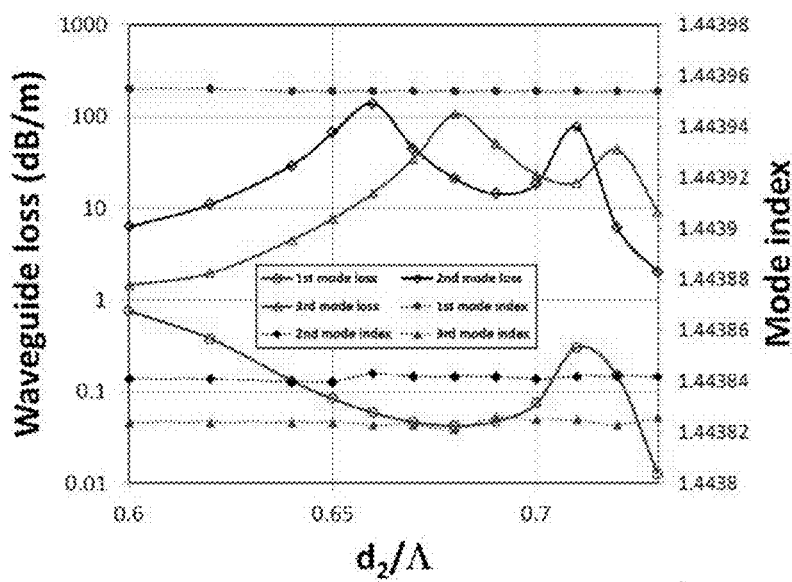
FIG. 12 is a graph showing loss calculation for a fiber with $d_2/\Lambda=0.68$, and $\Delta n_1=\Delta n_2=0.0155$.
Figure 13:
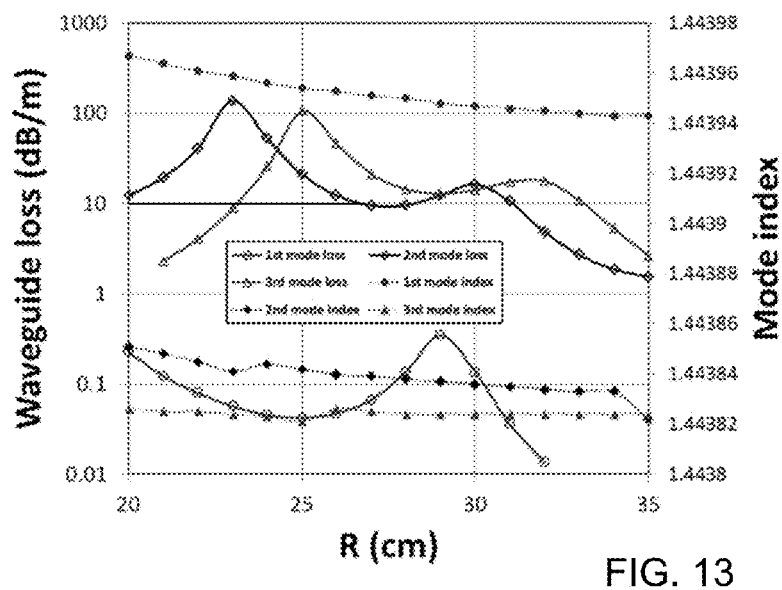
FIG. 13 is a graph showing the dependence of loss on coil radius for a fiber with $d_1/\Lambda=0.725$, $\Delta n_1=0.0155$, $d_2/\Lambda=0.68$, and $\Delta n_2=0.0155$.

In certain embodiments, the refractive indices of the first low refractive index glass features and the second low refractive index glass features are both at least about 0.008 less than the refractive index of the base glass material in which they are disposed. For example, in another fiber generally as described with respect to FIG. 4, both $\Delta n_1$ and $\Delta n_2$ are 0.0155. This can help to better confine the fundamental mode to the core region of the fiber, and can help to allow the fiber to be operated away from the resonant coupling regime that dominates the fundamental mode loss. Calculation results for this optical fiber ($d_1/\Lambda=0.7$) are shown in FIG. 11. The position of the resonant loss peak for the fundamental mode was at $d_2/\Lambda\sim0.71$ for a 50 cm coil diameter, with a loss minimum at $d_2/\Lambda\sim0.68$. The value of $d_2/\Lambda$ was therefore fixed at 0.68, and calculations were performed at a variety of values of $d_1/\Lambda$, as shown in FIG. 12. Values of $d_1/\Lambda$ in the range of 0.70 to 0.74 exhibited fundamental mode losses less than 0.1 dB/m at and higher order mode losses greater than 10 dB/m. FIG. 13 shows the dependence of loss on coil radius for a fiber with $d_1/\Lambda=0.725$, $\Delta n_1=0.0155$, $d_2/\Lambda=0.68$, $\Delta n_2=0.0155$; the difference between the smallest and largest coil diameter for which the optical fiber has a loss of less than about 0.1 dB/m for the fundamental mode and a loss greater than about 10 dB/m for all other modes is about 7.2 cm (i.e., 46.2 cm to 53.4 cm).

In certain embodiments, in the first ring, the ratio of the diameter of the first low refractive index glass features to the center-to-center spacing of the first low-refractive index features is in the range of about 0.67 to about 0.73, and the refractive index difference between the first low refractive index glass features and the material in which they are disposed is in the range of about 0.0008 to about 0.0018; and in the second ring, the ratio of the diameter of the second low refractive index glass features to the center-to-center spacing of the second low-refractive index features is in the range of about 0.74 to about 0.80, and the refractive index difference between the first low refractive index glass features and the material in which they are disposed is in the range of about 0.012 to about 0.019.

In certain embodiments, in the first ring, the ratio of the diameter of the first low refractive index glass features to the center-to-center spacing of the first low-refractive index features is in the range of about 0.79 to about 0.86, and the refractive index difference between the first low refractive index glass features and the material in which they are disposed is in the range of about 0.0008 to about 0.0018; and in the second ring, the ratio of the diameter of the second low refractive index glass features to the center-to-center spacing of the second low-refractive index features is in the range of about 0.69 to about 0.77, and the refractive index difference between the first low refractive index glass features and the material in which they are disposed is in the range of about 0.012 to about 0.019

In certain embodiments, in the first ring, the ratio of the diameter of the first low refractive index glass features to the center-to-center spacing of the first low-refractive index features is in the range of about 0.69 to about 0.76, and the refractive index difference between the first low refractive index glass features and the material in which they are disposed is in the range of about 0.0008 to about 0.0018; and in the second ring, the ratio of the diameter of the second low refractive index glass features to the center-to-center spacing of the second low-refractive index features is in the range of about 0.64 to about 0.72, and the refractive index difference between the first low refractive index glass features and the material in which they are disposed is in the range of about 0.012 to about 0.019.

In certain embodiments, in the first ring, the ratio of the diameter of the first low refractive index glass features to the center-to-center spacing of the first low-refractive index features is in the range of about 0.69 to about 0.76, and the refractive index difference between the first low refractive index glass features and the material in which they are disposed is in the range of about 0.012 to about 0.019; and in the second ring, the ratio of the diameter of the second low refractive index glass features to the center-to-center spacing of the second low-refractive index features is in the range of about 0.64 to about 0.72, and the refractive index difference between the first low refractive index glass features and the material in which they are disposed is in the range of about 0.012 to about 0.019.

A few exemplary designs are illustrated in Table 1, below:

TABLE 1

| Parameters | $d_1/\Lambda = 0.7$<br>$d_2/\Lambda = 0.775$<br>$\Delta n_1 = 0.0013$<br>$\Delta n_2 = 0.0155$ | $d_1/\Lambda = 0.825$<br>$d_2/\Lambda = 0.74$<br>$\Delta n_1 = 0.0013$<br>$\Delta n_2 = 0.0155$ | $d_1/\Lambda = 0.725$<br>$d_2/\Lambda = 0.68$<br>$\Delta n_1 = 0.0155$<br>$\Delta n_2 = 0.0155$ |
|---|---|---|---|
| $d_1/\Lambda$ for $\alpha_{FM} < 0.1$ dB/m and $\alpha_{HOM} > 10$ dB/m | NA | 0.796-0.86 (7.7%) | 0.707-0.741 (4.7%) |
| $d_2/\Lambda$ for $\alpha_{FM} < 0.1$ dB/m and $\alpha_{HOM} > 10$ dB/m | NA | 0.726-0.753 (3.7%) | 0.654-0.702 (7.1%) |
| R (cm) for $\alpha_{FM} < 0.1$ dB/m and $\alpha_{HOM} > 10$ dB/m | >21.2 | 23.7-27 (13%) | 23.1-26.7 (14.4%) |
| Effective mode area ($\mu m^2$) at R = 25 cm | 1141.2 | 1038.3 | 956.6 |
| Fundamental loss at R = 25 cm (dB/m) | 0.061 | 0.036 | 0.042 |
| Minimum HOM loss at R = 25 cm (dB/m) | 2.4 | 31.0 | 21.1 |

Of course, the person of skill in the art can use the methods and guidelines described herein to develop other optical fibers and optical fiber devices of the present invention. For example, the person of skill in the art can choose various values of $n_1$, $n_2$, $\Lambda$ and $d_1$, and find the $d_2$ value for which the resonance occurs in the fundamental mode. Based on that, a value of $d_2$ can be selected, then $d_1$ can be selected to provide a desired differential loss. Of course, other methods and calculations can also be used; as the person of skill in the art will appreciate, the resonance regime can be avoided in a number of other manners, including by fabricating actual optical fibers and testing them.

Figure 14:
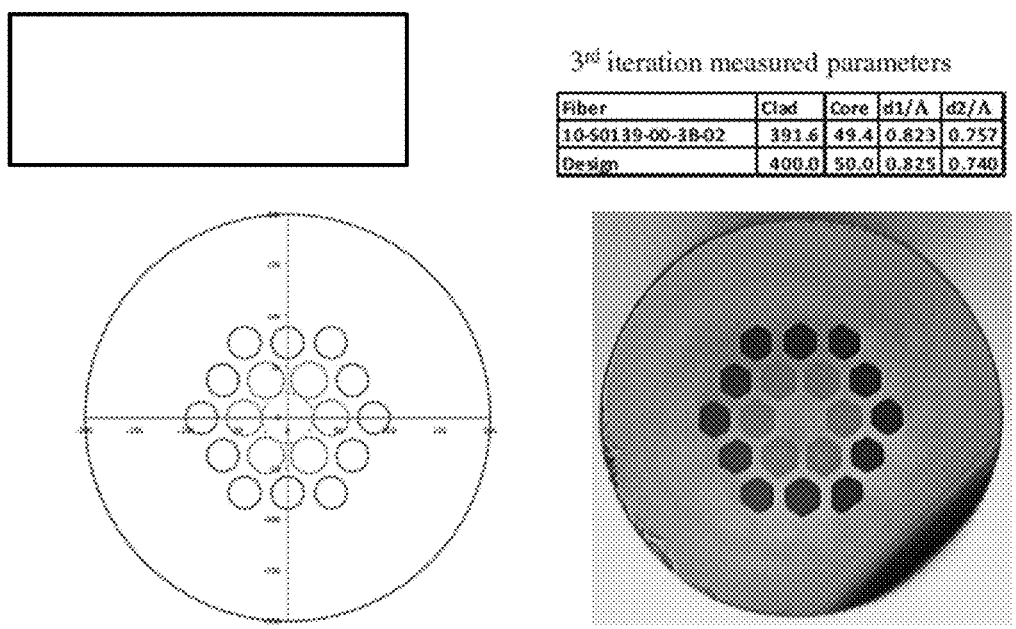
FIG. 14 shows the design details and a micrograph of an optical fiber according to the present invention.
Figure 15:
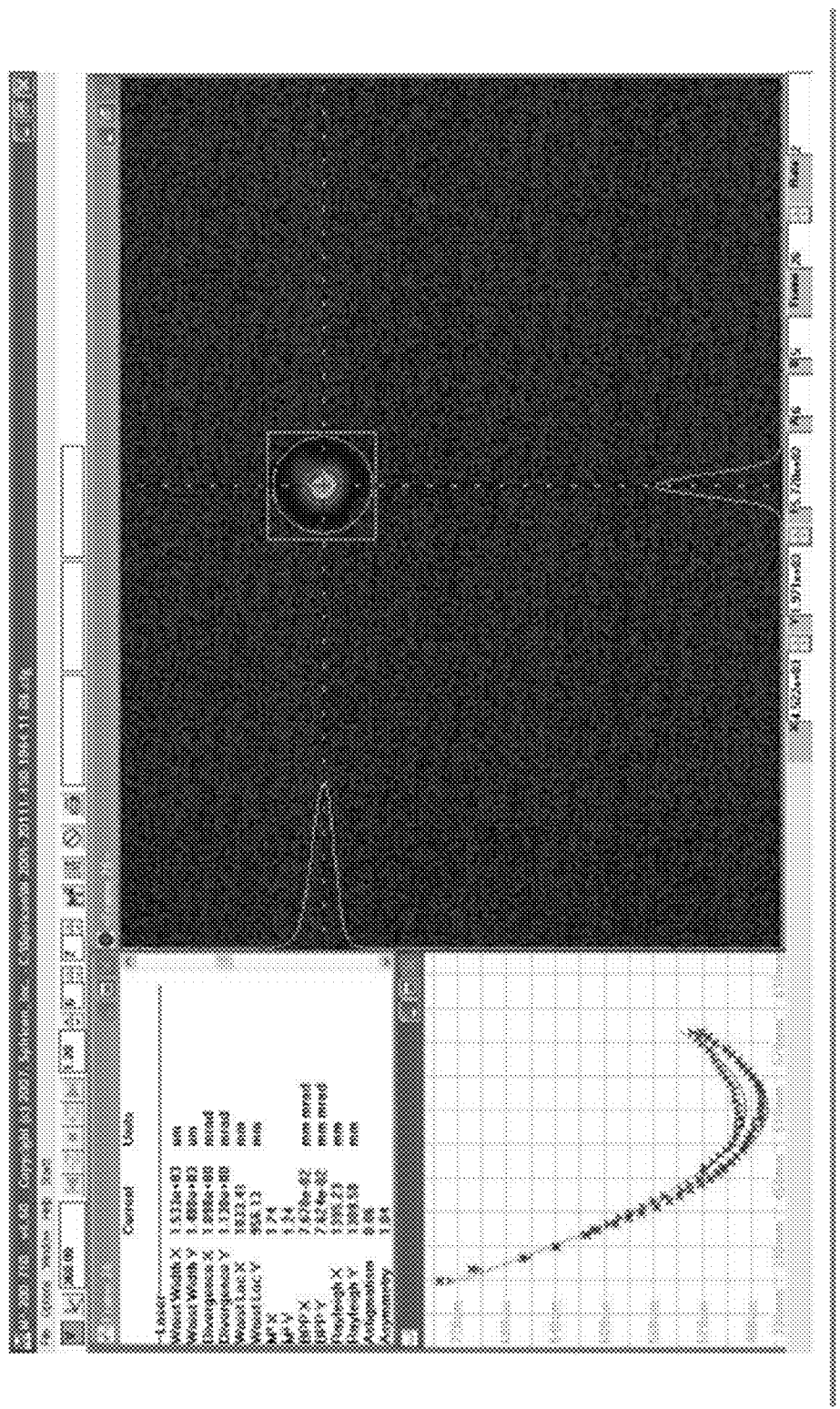
FIGS. 15-17 show the measured results for the fiber of FIG. 14.
Figure 16:
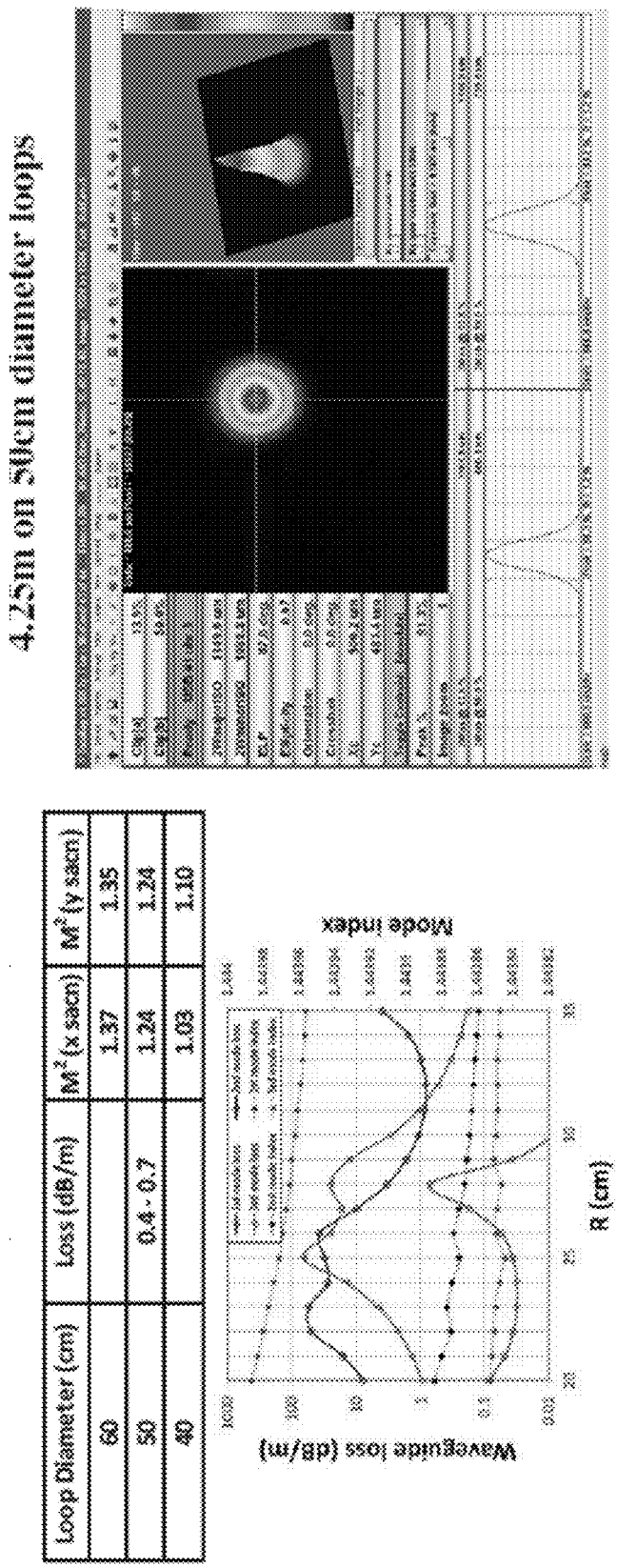
Figure 17:
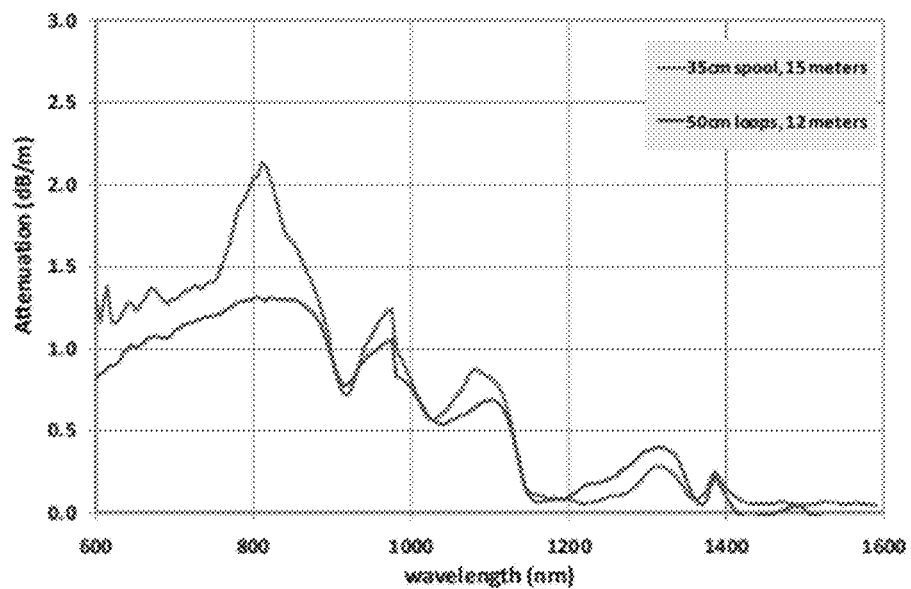

An optical fiber was constructed based on the design having $d_1/\Lambda=0.825$, $\Delta n_1=0.0013$, $d_2/\Lambda=0.74$, $\Delta n_2=0.0155$, using stack-and-draw methodology. Low refractive index rods with the recited $d_1/\Lambda$ and $d_2/\Lambda$ ratios are first drawn into canes a few millimeters in diameter. The canes are stacked in a closely packed pattern according to the design around a central cane, and the assembly is inserted into the inner diameter of a jacket tube and collapsed into a preform. The collapsed preform is then drawn into fibers. Of course, other methods familiar to the person of skill in the art can be used to make the optical fibers of the present invention. Details of the design and a micrograph of the cleaved fiber are shown in FIG. 14. The fiber was tested at 1060 nm in a length of 4.25 m in a 50 cm diameter coil; beam quality data is shown in FIG. 15, in which $M^2$ is shown to be less than 1.3. Loss and $M^2$ data, along with an image of the fundamental mode are shown in FIG. 16. Notably, while the beam had good quality at diameters of 40 and 50 cm, at a coil diameter of 60 cm, the beam quality degraded somewhat. The attenuation spectrum for the fiber is shown in FIG. 17.

Figure 18:
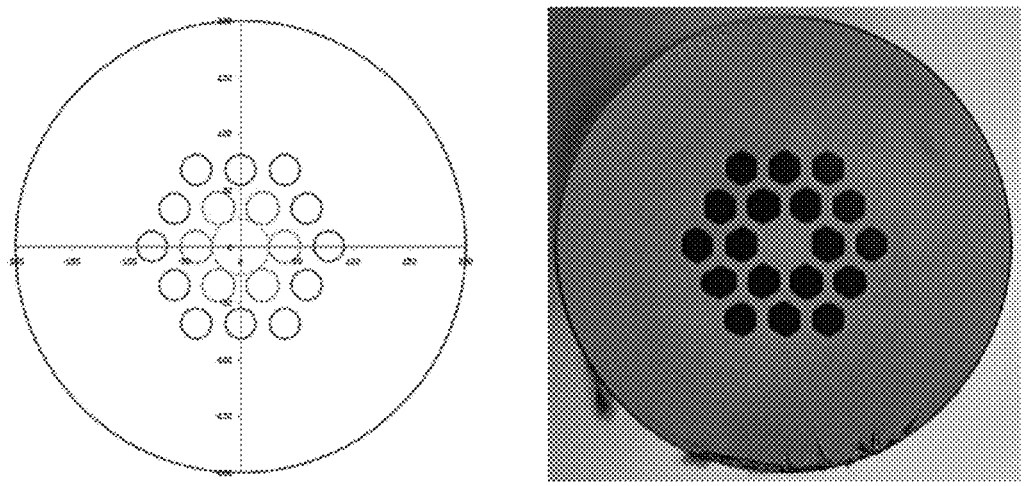
FIG. 18 shows the design details and a micrograph of another optical fiber according to the present invention.
Figure 19:
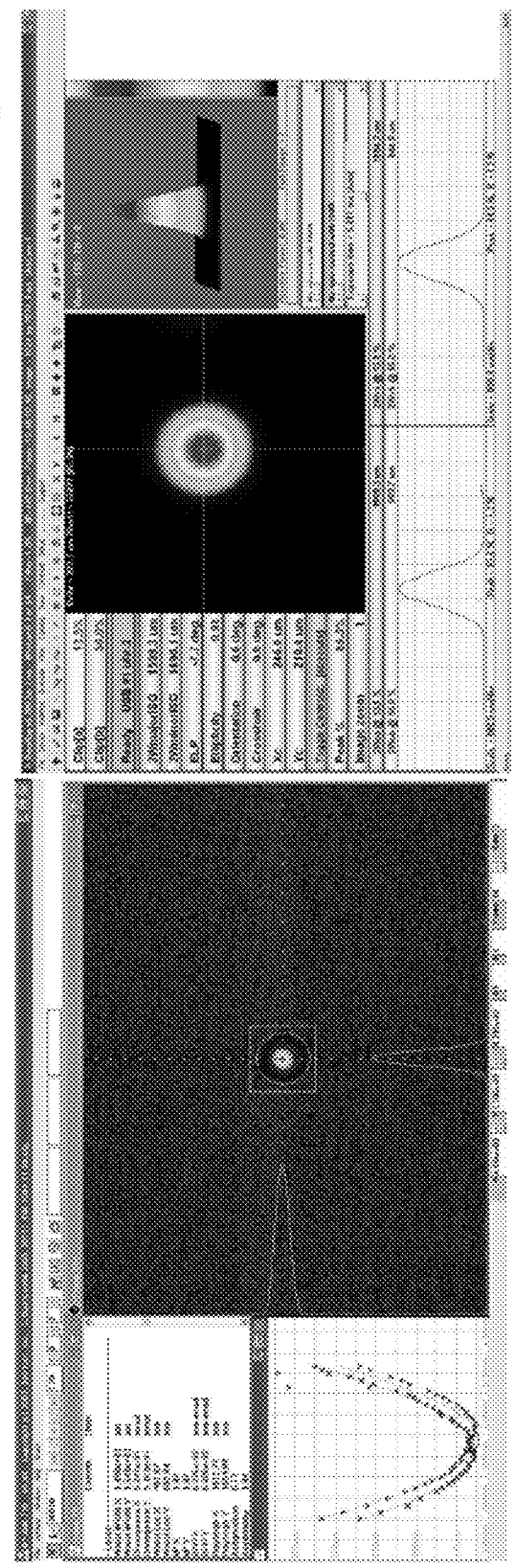
FIG. 19 shows the measured results for the fiber of FIG. 18.

An optical fiber was constructed based on the design having $d_1/\Lambda=0.725$, $\Delta n_1=0.0155$, $d_2/\Lambda=0.68$, $\Delta n_2=0.0155$, using stack-and-draw methodology. Details of the design and a micrograph are shown in FIG. 18. The fiber was tested at 1060 nm in a length of 60 cm in 40-60 cm diameter coils; data is presented in FIG. 19, which demonstrates $M^2$ less than 1.2 and losses on the order of 0.1-0.3 dB/m.

What is claimed is:

1. An optical fiber for use with radiation of a wavelength, the optical fiber having a cross-sectional profile comprising
   a base glass material, the base glass material being silica optionally doped with one or more dopants;
   a first ring of first low refractive index glass features disposed in the base glass material, the first low refractive index glass features having refractive indices in the range of 0.0005 to about 0.0400 less than the refractive index of the base glass material in which they are disposed, the first low refractive index glass features having diameters in the range of about 10 μm to about 70 μm, the first ring having an inner diameter in the range of about 20 μm to about 180 μm; and
   a second ring of second low refractive index glass features disposed in the base glass material outside of and substantially concentric with the first ring of first low refractive index glass features, the second low refractive index glass features having refractive indices in the range of 0.0005 to about 0.0400 less than the refractive index of the base glass material in which they are disposed, the second low refractive index glass features having diameters in the range of about 10 μm to about 70 μm, the center-to-center spacing of the second low refractive index glass features being in the range of about 10 μm to about 90 μm,
   wherein the refractive index profile of the base glass material, and the refractive indices, sizes and spacings of the first and second low refractive index glass features provide a loss of less than about 0.7 dB/m for the fundamental mode and a loss greater than about 10 dB/m for all other modes in a coiled configuration having a coil diameter in the range of about 20 cm to about 200 cm, and wherein the effective area of the fundamental mode of the optical fiber is at least about 300 μm².

2. The optical fiber of claim 1, wherein the refractive index profile of the base glass material, and the refractive indices, sizes and spacings of the first and second low refractive index glass features provide a loss of less than about 0.5 dB/m for the fundamental mode.

3. The optical fiber according to claim 1, wherein the refractive index profile of the base glass material, and the refractive indices, sizes and spacings of the first and second low refractive index glass features provide a loss greater than about 15 dB/m for all other modes.

4. The optical fiber according to claim 1, wherein the refractive index profile of the base glass material, and the refractive indices, sizes and spacings of the first and second low refractive index glass features provide a loss greater than about 25 dB/m for all other modes in a coiled configuration having a coil diameter in the range of about 20 cm to about 200 cm.

5. The optical fiber according to claim 1, wherein the coil diameter is in the range of about 30 cm to about 70 cm.

6. The optical fiber according to claim 1, wherein the base glass material comprises rare earth-doped silica in the center of the fiber, and silica not doped with rare earth but optionally doped with one or more other materials surrounding the rare earth-doped silica.

7. The optical fiber according to claim 1, wherein the refractive index difference between the first low refractive index glass features and the material in which they are disposed and/or the refractive index difference between the second low refractive index glass features and the material in which they are disposed is at least 0.002.

8. The optical fiber according to claim 1, wherein:
in the first ring, the ratio of the diameter of the first low refractive index glass features to the center-to-center spacing of the first low-refractive index features is in the range of about 0.67 to about 0.73, and the refractive index difference between the first low refractive index glass features and the material in which they are disposed is in the range of about 0.0008 to about 0.0018; and
in the second ring, the ratio of the diameter of the second low refractive index glass features to the center-to-center spacing of the second low-refractive index features is in the range of about 0.74 to about 0.80, and the refractive index difference between the first low refractive index glass features and the material in which they are disposed is in the range of about 0.012 to about 0.019.

9. The optical fiber according to claim 1, wherein:
in the first ring, the ratio of the diameter of the first low refractive index glass features to the center-to-center spacing of the first low-refractive index features is in the range of about 0.79 to about 0.86, and the refractive index difference between the first low refractive index glass features and the material in which they are disposed is in the range of about 0.0008 to about 0.0018; and
in the second ring, the ratio of the diameter of the second low refractive index glass features to the center-to-center spacing of the second low-refractive index features is in the range of about 0.69 to about 0.77, and the refractive index difference between the first low refractive index glass features and the material in which they are disposed is in the range of about 0.012 to about 0.019.

10. The optical fiber according to claim 1, wherein:
in the first ring, the ratio of the diameter of the first low refractive index glass features to the center-to-center spacing of the first low-refractive index features is in the range of about 0.69 to about 0.76, and the refractive index difference between the first low refractive index glass features and the material in which they are disposed is in the range of about 0.0008 to about 0.0018; and
in the second ring, the ratio of the diameter of the second low refractive index glass features to the center-to-center spacing of the second low-refractive index features is in the range of about 0.64 to about 0.72, and the refractive index difference between the first low refractive index glass features and the material in which they are disposed is in the range of about 0.012 to about 0.019.

11. The optical fiber according to claim 1, wherein
in the first ring, the ratio of the diameter of the first low refractive index glass features to the center-to-center spacing of the first low-refractive index features is in the range of about 0.69 to about 0.76, and the refractive index difference between the first low refractive index glass features and the material in which they are disposed is in the range of about 0.012 to about 0.019; and
in the second ring, the ratio of the diameter of the second low refractive index glass features to the center-to-center spacing of the second low-refractive index features is in the range of about 0.64 to about 0.72, and the refractive index difference between the first low refractive index glass features and the material in which they are disposed is in the range of about 0.012 to about 0.019.

12. The optical fiber according to claim 1, wherein the difference between the loss of the fundamental mode and the loss of the lowest-loss higher order mode is greater in the coiled configuration than in a straight configuration.

13. An optical fiber device comprising the optical fiber according to claim 1, disposed in a coiled configuration, the coil having a diameter such that the optical fiber has a loss of less than about 0.1 dB/m for the fundamental mode and a loss greater than about 10 dB/m for all other modes.

14. The optical fiber device of claim 13, wherein the device is configured for the generation or transmission of optical power greater than about 10 W.

15. The optical fiber according to claim 1, wherein the first low refractive index glass features differ substantially from the second low refractive index glass features in size, refractive index, or both.

16. The optical fiber according to claim 1, wherein
the first ring of first low refractive index glass features is provided as a substantially normal first polygon having at least 5 sides, with a first low refractive index feature disposed substantially at each vertex of the first polygon; and
the second ring of second low refractive index glass features is provided as a substantially normal second polygon having at least 5 sides, with a second low refractive index glass feature at each vertex of the second polygon, and at least one second low refractive index glass feature spaced evenly on each side of the second polygon.

17. An optical fiber for use with radiation of a wavelength, the optical fiber having a cross-sectional profile comprising:
a base glass material, the base glass material being silica optionally doped with one or more dopants;
a first ring of first low refractive index glass features disposed in the base glass material, the first low refractive index glass features having refractive indices in the range of 0.0005 to about 0.0400 less than the refractive index of the base glass material in which they are disposed, the first low refractive index glass features having diameters in the range of about 10 μm to about 70 μm, the first ring having an inner diameter in the range of about 20 μm to about 180 μm; and
a second ring of second low refractive index glass features disposed in the base glass material outside of and substantially concentric with the first ring of first low refractive index glass features, the second low refractive index glass features having refractive indices in the range of 0.0005 to about 0.0400 less than the refractive index of the base glass material in which they are disposed, the second low refractive index glass features having diameters in the range of about 10 μm to about 70 μm, the center-to-center spacing of the second low refractive index glass features being in the range of about 10 μm to about 90 μm,
wherein the refractive index profile of the base glass material, and the refractive indices, sizes and spacings of the first and second low refractive index glass features provide a loss of less than about 0.1 dB/m for the fundamental mode and a loss greater than about 10 dB/m for all other modes over a range of coiled configurations, the range of coiled configurations having a difference between smallest diameter and largest diameter in the range of about 1 cm to about 25 cm, and wherein the effective area of the fundamental mode is at least about 300 μm².

18. An optical fiber device comprising a coil of optical fiber, the coil having a diameter in the range of about 20 cm to about 200 cm, the optical fiber having a cross-sectional profile comprising
a base glass material, the base glass material being silica optionally doped with one or more dopants;
a first ring of first low refractive index glass features disposed in the base glass material, the first low refractive index glass features having refractive indices in the range of 0.0005 to about 0.0400 less than the refractive index of the base glass material in which they are disposed, the first low refractive index glass features having diameters in the range of about 10 µm to about 70 µm, the first ring having an inner diameter in the range of about 20 µm to about 180 µm; and a second ring of second low refractive index glass features disposed in the base glass material outside of and substantially concentric with the first ring of first low refractive index glass features, the second low refractive index glass features having refractive indices in the range of 0.0005 to about 0.0400 less than the refractive index of the base glass material in which they are disposed, the second low refractive index glass features having diameters in the range of about 10 µm to about 70 µm, the center-to-center spacing of the second low refractive index glass features being in the range of about 10 µm to about 90 µm, wherein the refractive index profile of the base glass material, and the refractive indices, sizes and spacings of the first and second low refractive index glass features provide an overall coil loss of less than about 4 dB for the fundamental mode and a loss greater than about 10 dB for all other modes, and wherein the effective area of the fundamental mode is at least about 300 µm$^2$.

19. The optical fiber device of claim 18, wherein the refractive index profile of the base glass material, and the refractive indices, sizes and spacings of the first and second low refractive index glass features provide an overall coil loss of less than about 2 dB for the fundamental mode.

20. The optical fiber device according to claim 18, wherein the refractive index profile of the base glass material, and the refractive indices, sizes and spacings of the first and second low refractive index glass features provide an overall coil loss greater than about 15 dB for all other modes.

* * * * *